JOHN HENRY FIELD
GEORGE ROBERTSON PARKES
INVENTORS

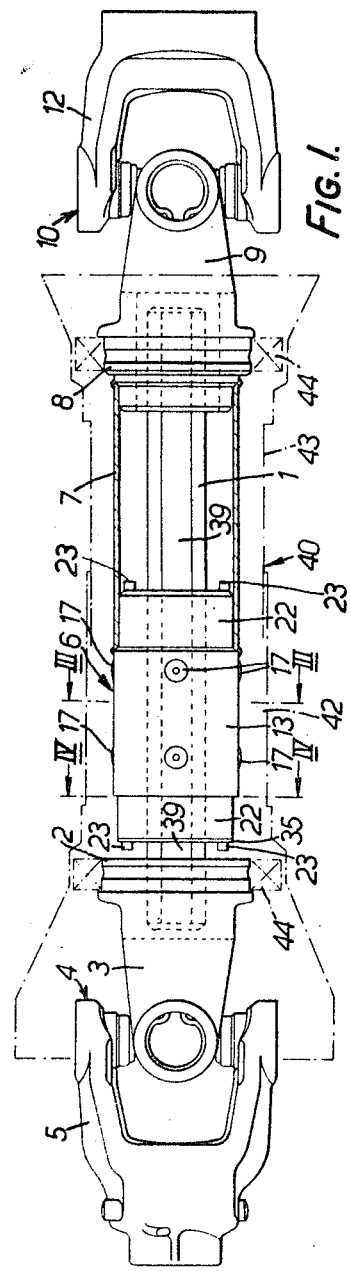
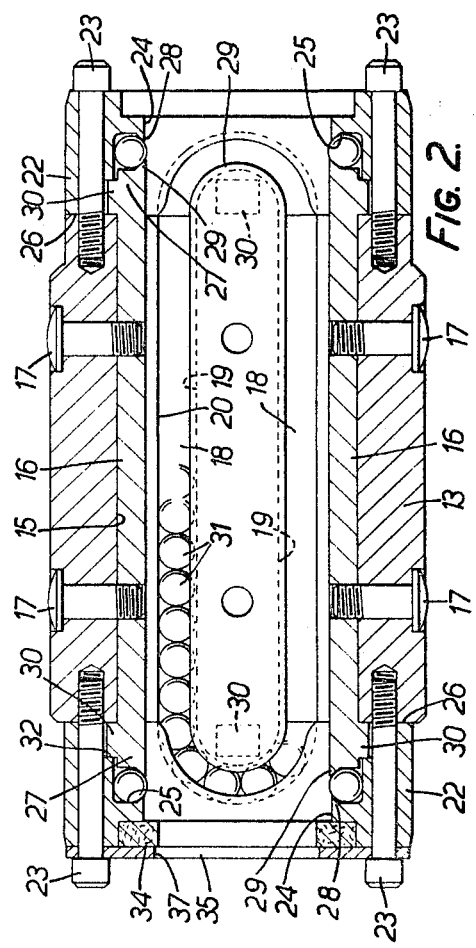

BY Young + Thompson
ATTORNEYS

United States Patent Office 3,449,927
Patented June 17, 1969

3,449,927
SHAFT COUPLINGS
John Henry Field, Leyfields, Tamworth, and George Robertson Parkes, Sutton Coldfield, England, assignors to Birfield Engineering Limited, London, England
Filed Mar. 22, 1967, Ser. No. 625,222
Claims priority, application Great Britain, Mar. 22, 1966, 12,431/66
Int. Cl. F16d *3/06;* F16c *17/00, 21/00*
U.S. Cl. 64—23                                    4 Claims

ABSTRACT OF THE DISCLOSURE

A recirculating ball coupling for transmitting torque and accommodating axial displacement between an inner shaft member and an outer hollow member which has four longitudinal grooves formed in its inner surface. An elongated retaining member is located centrally in each groove to define, at the sides of the groove, two longitudinally extending ball passages which cooperate with semi-circular transfer passages to allow the balls to recirculate. The transfer passages are formed wholly within two end members respectively secured to the ends of the outer member.

---

This invention relates to shaft couplings which accommodate relative axial movement or "plunge" of coupled shafts while transmitting torque between them. It is particularly concerned with such couplings in which recirculating series of balls engage and are arranged between inner and outer coupling members.

The object of the invention is to provide a coupling which is simple to manufacture, particularly with regard to the formation of transfer passages through which the balls recirculate at the ends of the coupling.

According to the invention a recirculating ball coupling comprises an inner member axially displaceable and non-rotatable within a tubular outer member which has a plurality of longitudinally extending grooves on its inner surface, and ball-retaining members which are respectively centrally located one in each groove so as to define two laterally spaced and longitudinally extending ball passages, recirculation of the balls between the two passages of each groove occurring through corresponding transfer passages which are formed wholly within end members secured to the ends of the outer member.

In use rolling motion of the balls accommodates plunge of the coupled shafts, the torque being transmitted by the balls in one passage of each groove with the balls in the other passage unloaded so that the balls recirculate.

Preferably the inner member is rectangular in cross-section, conveniently square but shaped so that it is not possible to assemble the coupling with the inner and outer members 90° out of phase. This is conveniently achieved by forming the inner member with longitudinally extending shallow depressions on opposite sides thereof, and providing an end plate with an aperture which has a complementary shape and through which the shaft passes. This feature is of the utmost importance when the coupling is located between two Hooke's type universal joints which, if assembled incorrectly, will not be in rotational balance.

Alternatively, correct assembly of the inner member within the outer member may be assured by making the inner member rectangular in cross-section. The grooves may be rectangular in cross-section with four identical grooves arranged symmetrically within the outer member.

In the case of a rectangular section inner member other than square, one pair of opposing grooves will normally be wider than the other pair of opposing grooves. This construction also has the advantage that it is not possible to assemble the coupling with the inner member 90° out of phase.

Each retaining member is preferably a solid die-casting, opposed longitudinal edges of which define, with the side walls of the grooves, the ball passages. The longitudinal edges of each retaining member may have outwardly projecting lips to retain the balls in the passages with the inner member withdrawn from the outer member. Alternatively, each retaining member may be of channel-like form, the limbs of which project centrally towards the axis of the outer member with the balls located between each limb and the adjacent side wall of the groove. In this case the free ends of the limbs of each channel-like retaining member may be turned outwardly to retain the balls in the passages.

Each transfer passage is conveniently semicircular, the diameter being equal to the lateral spacing of the longitudinal ball passages and the depth greater than that of the latter so that smooth recirculation of the balls is obtained. Preferably each transfer passage is a recess in the end member which may be formed from an oil-retaining sintered metallic or die-cast block. The ends of the retaining members may project into the corresponding recess and each end may be shaped to define with the recess the semi-circular transfer passage. Thus, the recesses are symmetrically disposed on the inner face of the corresponding end block, and each recess may be formed with an inwardly projecting lip for retention of the balls within the recess.

The invention will now be further described with reference to the accompanying drawings which show, by way of example, a universally-jointed transmission shaft for driving an agricultural implement from a power take-off shaft of an agricultural tractor, and embodying a recirculating ball coupling in accordance with the invention. In the drawings:

FIGURE 1 is a side view of the transmission shaft, partly shown in section,

FIGURE 2 is an axial cross-sectional view of an outer member of the coupling on an enlarged scale.

Figure 3:
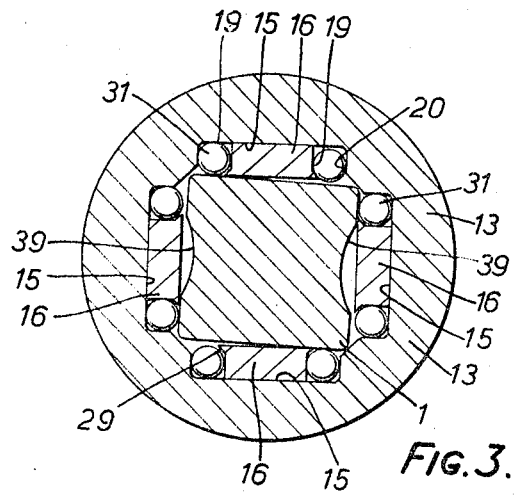
FIGURE 3 is a cross-sectional view, also to an enlarged scale, on the line III—III of FIGURE 1.

The transmission shaft comprises a solid shaft member 1 which is fixed in a boss 2 of a yoke member 3 of a Hooke's type universal joint 4, the cooperating yoke member 5 of this universal joint being formed for connection to the tractor (not shown). The shaft member 1 forms an inner member of the coupling, indicated generally by the reference numeral 6 in FIGURE 1, and telescopes within a tubular shaft member 7 of the transmission shaft to accommodate plunge. One end of the shaft member 7 is connected to a boss 8 of a yoke member 9 of a Hooke's type joint 10, the other yoke member 12 of which is formed for connection to the implement (not shown).

A tubular outer member 13 of the coupling 6 fits within and is welded to the adjacent end of the shaft member 7. The coupling 6 thus transmits the driving torque while accommodating axial plunge between a fully compressed position shown in FIGURE 1 and a fully extended position in which the spacing of the Hooke's type joints 4 and 10 is a maximum and which is determined by the effective length of the shaft member 1. The inner surface of the coupling member 13 is broached to form four identical and symmetrically disposed grooves 15 of rectangular section which extend over the full axial length of the member 13.

An elongated retaining member in the form of a die-cast metal plate 16 is secured centrally in each groove 15 by self-locking screws 17. This provides a longitudinal ball passage 18 between each longitudinal edge 19 of the retaining member 16 and the adjacent side wall 20 of the corresponding groove 15.

Two end members of the coupling 6 in the form of sintered metallic blocks 22 are respectively secured to the ends of the coupling member 13 by screws 23. Each end block 22 has a central square aperture 24 through which the member 1 slides and four transfer passages in the form of semi-circular recesses 25 formed in one face 26 of the block 22. The semi-circular planes of the recesses 25 are perpendicular to the corresponding inner face 26 of the end block 22 in which they are formed, the recesses 25 being symmetrically disposed and respectively lying on the sides of a square on that face. The inner semi-circular edge of each recess 25 is formed with an inwardly projecting lip 28.

Each end 27 of each retaining member 16 projects into the corresponding recess 25, and is so shaped as to define with that recess 25 one semi-circular transfer passage. The peripheral edge of each retaining member 16 has an outwardly projecting lip 29 which acts to retain the balls 31 within the corresponding ball passage when the inner coupling member 1 is withdrawn from the outer coupling member 13.

Figure 4:
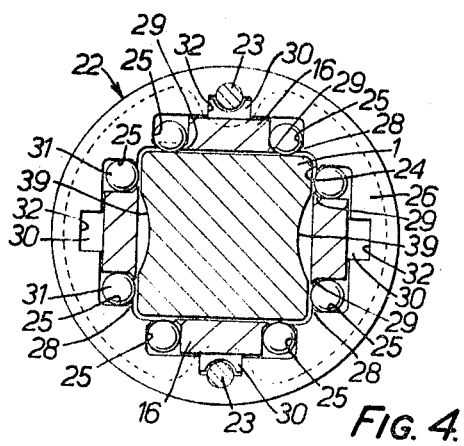
FIGURE 4 is a view, similar to that of FIGURE 3, but on the line IV—IV of FIGURE 1.

The ends 27 of the retaining members 16 are each provided with an integral projection 30 which locates within a cavity 32 in the corresponding end block 22. As shown in FIGURE 4, two of the cavities 32 in each end block 22 break into drilled bores through which the screws 23 pass, the projections 30 in these cavities being cut away to clear these screws.

Figure 5:
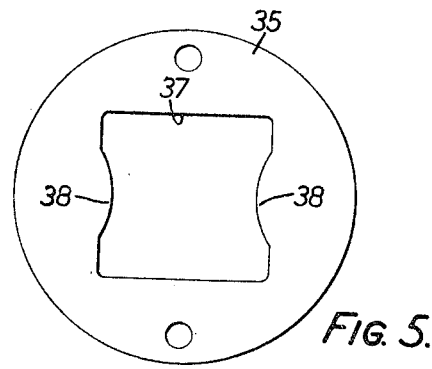
FIGURE 5 illustrates a component of the coupling.

The end block 22 remote from the shaft member 7 houses a seal 34 which closely fits the coupling member 1 and retains lubricant within the coupling while excluding dirt therefrom. An end plate 35 which retains the seal 34 is held in position by the screws 23. The end plate 35 is shown in detail in FIGURE 5 and has a central aperture 37 which is generally square but two opposed edges of which have inwardly extending arcuate portions 38. The inner coupling member 1 is of complementary profile, i.e. is generally square in cross-section with longitudinal shallow depressions 39 rolled on two opposed sides. This prevents the inner coupling member 1 being fitted into the outer member 13 90° out of phase, so that correct phasing of the universal joints 4 and 10 is ensured.

To comply with safety regulations a transmission shaft guard of conventional form can be fitted, shown in broken lines in FIGURE 1 and generally designated 40. The guard comprises two relatively telescopic tubes 42 and 43 which are respectively rotatably mounted on the bosses 2 and 8 of the yoke members by bearings 44, the inner races of which are machined on the corresponding yoke members.

In use plunge of the transmission shaft is accommodated by the rolling motion of the balls 31 within the passages defined in the grooves 15 by the retaining members 16. The torque is transmitted by the balls 31 in one passage of each groove 15, the balls in the other passage being unloaded so that recirculation of the balls 31 from one passage to the other passage of each groove occurs through the transfer passages in the blocks 22 at each end of the coupling.

A recirculating ball coupling constructed in accordance with the invention has the particular advantage that the grooves such as 15 in the outer member 13 are simply formed by a broaching operation and each retaining member 16 provides a simple means of forming two longitudinally extending passages in one of the grooves 15 and of retaining the balls 31 within the passages even if the inner member 1 is withdrawn and before it is fitted. Thus prior to assembly the outer member 13 with the retained balls 31 and attached members forms a compact subassembly. In addition the relatively complicated transfer passages are formed in end blocks 22 which are readily manufactured by a sintering or die-casting operation.

As shown in FIGURE 3, the balls 31 in one longitudinal passage 18 of each groove 15 transmit the torque and are in contact with both the bottom of the longitudinal passage 18 and the inner member 1, the balls in the other longitudinal passage 18 of each groove 15 being unloaded. The depth of the transfer passages is slightly greater than the depth of the longitudinal passages in order to allow free circulation of the balls 31 in the transfer passages when the coupling 6 is accommodating plunge and transmitting torque. Thus, as shown in FIGURES 2 and 4, each end 27 of each retaining member 16 is spaced from the bottom of the corresponding groove 15.

We claim:
1. A recirculating ball coupling comprising an inner member, a tubular outer member which is axially displaceable and non-rotatable with respect to the inner member and which has a plurality of longitudinally extending grooves on its inner surface, and ball-retaining members which are respectively centrally located one in each groove so as to define at the sides of each groove two laterally spaced and longitudinally extending ball passages, recirculation of the balls between the two passages of each groove occurring through corresponding transfer passages each of which is in the form of a recess in a corresponding one of two end members respectively secured to the two ends of the outer member, with each end of each retaining member projecting into the corresponding recess to define with that recess the corresponding transfer passage, and wherein the inner member is generally square in cross-section and formed with a longitudinally extending shallow depression on each of two opposed sides of the inner member and an apertured end plate is secured to one of the end members, the aperture in the end plate being of complementary shape to the inner member so as to ensure that the inner and outer members cannot be assembled 90° out of phase with respect to their normal angular relationship.

2. A coupling according to claim 1, wherein each side wall of each recess is formed with an inwardly projecting lip to retain the balls within the recess when the inner member is not in position.

3. A coupling according to claim 1, wherein each retaining member is in the form of a solid die-cast plate the complete peripheral edge of which is formed with an outwardly projecting lip which retains the balls in the longitudinal passages of the corresponding groove when the inner member is not in position within the outer member.

4. A coupling according to claim 1, wherein the end plate retains a seal which acts to retain lubricant within the coupling while excluding dirt therefrom.

(References on following page)

References Cited

UNITED STATES PATENTS

| | | | |
|---|---|---|---|
| 2,198,654 | 4/1940 | Calkins et al. | 64—23 |
| 2,452,117 | 10/1948 | Ferger | 308—6 |
| 2,696,090 | 12/1954 | Harrington | 64—23 |
| 2,810,274 | 10/1957 | Weasler | 64—23 X |
| 2,908,152 | 10/1959 | Anderson | 64—23 |
| 3,143,867 | 8/1964 | Anderson | 64—23 |
| 3,318,109 | 5/1967 | Ressler et al. | 64—23 |

FOREIGN PATENTS

| | | |
|---|---|---|
| 679,843 | 9/1952 | Great Britain. |

HALL C. COE, *Primary Examiner.*

U.S. Cl. X.R.

308—6